(12) United States Patent
Kikuchi et al.

(10) Patent No.: US 6,394,137 B1
(45) Date of Patent: *May 28, 2002

(54) FLUID SUPPLY VALVE

(75) Inventors: Hirofumi Kikuchi, Kanagawa-ken; Youichi Nishimuro; Kunio Machida, both of Tokyo, all of (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/330,064

(22) Filed: Jun. 11, 1999

(30) Foreign Application Priority Data

Jun. 16, 1998  (JP) ............................................ 10-168861
Jun. 16, 1998  (JP) ............................................ 10-168875

(51) Int. Cl.$^7$ ............................................... F16K 15/14
(52) U.S. Cl. ........................ 137/859; 137/852; 251/368
(58) Field of Search ................. 137/855, 852, 137/857, 859; 251/368

(56) References Cited

U.S. PATENT DOCUMENTS

| | | | | |
|---|---|---|---|---|
| 2,526,019 A | * | 10/1950 | Fowler | 137/859 |
| 2,646,063 A | * | 7/1953 | Hayes | 137/859 X |
| 3,073,339 A | * | 1/1963 | Stelzer | 137/859 X |
| 3,176,712 A | * | 4/1965 | Ramsden | 137/859 X |
| 3,270,771 A | * | 9/1966 | Morgan et al. | 137/859 |
| 3,465,786 A | * | 9/1969 | Spisak | 137/859 X |
| 3,508,576 A | * | 4/1970 | Gross | 137/859 |
| 4,514,742 A | * | 4/1985 | Suga et al. | 347/85 |
| 5,305,795 A | * | 4/1994 | Forberg | 137/859 |
| 5,388,615 A | * | 2/1995 | Edlund et al. | 137/859 |
| 6,000,788 A | * | 12/1999 | Iida | 347/86 |

FOREIGN PATENT DOCUMENTS

| | | | |
|---|---|---|---|
| DE | 1 009 870 | 6/1957 | |
| DE | 1 852 284 | 5/1962 | |
| DE | 1 550 194 | 8/1969 | |
| DE | 2 230 642 | 12/1972 | |
| GB | 751289 | * 6/1956 | 137/859 |
| JP | 0072271 | * 3/1990 | 137/859 |
| WO | WO 92/12371 | 7/1992 | |
| WO | WO 96/14913 | 5/1996 | |

* cited by examiner

*Primary Examiner*—John Rivell
(74) *Attorney, Agent, or Firm*—Oblon, Spivak, McClelland, Maier & Neustadt, P.C.

(57) ABSTRACT

There is disclosed a fluid supply value comprising a disc-shaped valve body which is equipped with a fluid supply port in the central portion thereof and composed of an elastic material whose peripheral portion is reinforced and fixed with a rigid material, the fluid supply port being closed when the valve body abuts against a fixed valve seat placed so as to be opposite to the fluid supply port, and being opened when the valve body is separated from the fixed valve seat, wherein the disc-shaped valve body is equipped further with a thin-walled portion in the intermediate annular portion between the fluid supply port and the peripheral portion in the radial direction, and/or with an inflectional portion in the radial direction between the fluid supply port and the peripheral portion. According to the above constitution, it is made possible to minimize the reaction force at the time of the deformation of the valve body and thus to provide an ink tank valve capable of favorably supplying a recording head with a proper amount of ink.

9 Claims, 4 Drawing Sheets

FLUID SUPPLY VALVE

BACKGROUND OF THE INVENTION

1. Field of the Invention

The present invention relates to a fluid supply valve. More particularly, the present invention is concerned with a fluid supply valve which is well suited as an ink tank valve particularly in an ink jet recording apparatus for the purpose of favorably supplying a recording head portion from an ink chamber with an ink in an amount corresponding to the amount of an ink which is discharged from said recording head portion at the time of recording.

2. Description of the Related Arts

An ink jet recording apparatus has heretofore been equipped with an ink tank which has an ink chamber to be filled in with an ink and also an ink supply portion which supplies a recording head portion with an ink. Examples of types of the ink tanks include a type which is constituted so that an ink is supplied to a recording head which is stationarily attached to a carriage, through tubes arranged everywhere in an ink jet recording apparatus, and an ink tank is freely attachable to and detachable from said apparatus; a type in which an ink tank is constituted integrally with a recording head, and the resultant integrated unit is freely attachable to and detachable from a carriage; and the like types.

In the former type of the ink tank, an ink is supplied to the recording head by providing a water head difference therebetween, while in the latter type, an ink is supplied to the recording head by providing the ink tank with a negative pressure generation source.

There have frequently been proposed in recent years, the ink jet recording apparatuses which adopt the latter type of the ink tank from the viewpoints of miniaturizing the apparatuses as well as the easiness of maintenance work.

Such an ink tank is required to be capable of favorably supplying an ink in an amount corresponding to the amount of the ink discharged from the recording head at the time of recording, and also to be free from the leakage of an ink through a discharge port at the time of nonrecording.

There is available for example, as an ink tank meeting the above-mentioned requirements, an ink tank in the form of cartridge which is freely attachable to and detachable from a carriage, and in which a recording head is integrated with an ink tank, and an absorbent (foam) is filled inside the ink tank. It is made possible by such an absorbent filled in an ink tank to maintain the ink meniscus at an stable level at the ink discharge portion of the recording head, and at the same time it is made possible by the capillary power of the absorbent to properly preserve the ink in the ink tank. In this case, it is needed that almost entire inside of the ink tank be filled in with the absorbent. Thus by allowing the absorbent to preserve an amount of ink a slightly less than the maximum preservable amount thereof, the capillary power of the absorbent is utilized to generate a negative internal pressure. It is therefore, made possible to minimize the amount of the ink leaking through the discharge portion of the recording head and through the ink tank portion communicating with the atmosphere, even in the case where a mechanical shock such as vibration or a thermal shock such as temperature variation is applied to the recording head and the ink tank.

The aforesaid method in which the ink tank inside is almost entirely filled with an absorbent involves the problems that the negative pressure of the absorbent increases accompanying the consumption of the ink, and increases the amount of the ink remaining in the ink tank without being supplied to the recording head, thereby bringing about a low utilization efficiency of the ink.

In order to solve such problems, there is proposed, for example, a cartridge for an ink-jet recording head which cartridge is constituted so that an ink reservoir is separated from a cavity by a wall equipped with a communication opening on the lower side of an ink tank, and an umbrella check valve is installed movably in the communication opening so as to discharge the ink in the ink reservoir into the cavity by opening itself at the point of the time when the ink pressure in the ink-jet recording head is lowered, whereby the ink is supplied to the ink-jet recording head [refer to Japanese Patent Application Laid-Open No. 231759/1987 (Sho-62)].

According to the above-mentioned constitution it is made unnecessary to accommodate an absorbent in the cartridge, thereby enabling to enlarge the substantial accommodation capacity of the ink tank. In general, however, a serious problem with the aforesaid constitution remains unsolved in that the umbrella check valve has an offset valve which is too high to precisely regulate the amount of the ink to be supplied to the recording head, thus bringing about unfavorable variation in the amount of the ink to be supplied and consequent deterioration of the quality of the printed letters.

There are also problems that in the state of the umbrella check valve being opened, the recording head is completely isolated from the ink reservoir, which increases the pressure in the cavity, destroys the seal at the connection to the recording head, and thereby causes ink leakage when the ink in the cavity is volumetrically expanded by 2 to 5%, approx. owing to the variation in the environmental temperature; and that in the stat of the ink tank being mounted on the recording head, the increased pressure as mentioned above is applied as such to the recording head, which makes it impossible to maintain a negative pressure between the recording head and the ink tank, and thereby causes ink leakage through the recording head.

There is further a problem that since the umbrella check valve is not imparted with a sufficient valve-opening power by several tens millimeter of water column that is to be maintained for the purposes of stably supplying the recording head with the ink, there is a fear that the valve is opened in response to the swing of the ink caused by the movement of a carriage, thereby bringing about inferior stability of the printed letters.

In order to solve the foregoing problems involved in such an umbrella check valve in such circumstances, an attempt is made, for example, to employ an ink tank valve which is installed at the position dividing an ink chamber and an ink supply portion, is moved by the difference in pressure between the ink chamber and the ink supply portion, and supplies the recording head with the ink filled in the ink chamber.

By equipping the ink tank with such an ink tank valve, it is made possible to certainly supply the recording head with the ink, by surely responding to the slight difference in pressure between the ink tank and the recording head without being influenced by the swing of the ink due to the movement of the carriage, while maintaining the negative pressure well suited for printing between the recording head and a recording medium. It is further made possible thereby to prevent the ink from leaking by variation in temperature through the ink supply port or through the recording head.

As the structure of the ink tank valve which is installed at the position dividing the ink chamber and the ink supply portion, there have been proposed a variety of structures, of which the structures as shown in FIGS. 1 and 2, respectively are preferably exemplified.

FIG. 1 is a cross-sectional view showing one example of an ink tank valve, while FIG. 2 is a partially cross-sectional view showing one example of a disc-shaped valve body to be used in said ink tank valve. The ink tank valve C is installed at the position dividing the ink chamber A and the ink supply portion B. The disc-shaped valve body 1 to be used in the ink tank valve C is constituted of a disc-shaped elastic material which has an ink supply port 3 in the central part thereof and the peripheral portion of which is reinforced with the fixed to a rigid material such as polypropylene. The aforesaid disc-shaped valve body 1 is supported by a movable support 5 equipped with a spring 6, and abuts against a fixed valve seat 4 at the time of non-recording, while the ink tank valve C is in the closed state. Since the ink in the ink supply portion B is supplied to the recording head portion at the time of recording, the ink therein is decreased to cause negative pressure therein. In consequence, the movable support 5 moves towards the compression direction of the spring, and thus the disc-shaped valve body 1 is separated from the fixed valve seat 4 and brings the ink tank valve C to an opened state, whereby the ink in the ink chamber A is supplied to the ink supply portion B through the ink supply port 3. When the negative pressure in the ink supply portion B is eliminated thereby, the disc-shaped valve body 1 again abuts against the fixed valve seat 4 by the action of the movable support 5, and thus stops the supply of ink to the ink supply portion B.

It is important with regard to the ink tank valve having such a structure that the ink tank valve be capable at the time of recording, of supplying an ink in an amount corresponding to the amount of the ink that is discharged from the recording head. In order to meet the above-mentioned requirement, it is desirable to weaken the reaction force in the case of the deformation of the disc-shaped valve body to be used in the ink tank valve. However, the disc-shaped valve body to be used in a conventional ink tank valve, which usually has the structure as shown in FIG. 2, and a wall thickness of 0.4 mm, approximately, has involved such problems that the reaction force is not necessarily weak in the case of the deformation of the disc-shaped valve body and at the same time, the supply of the ink can not sufficiently follow the amount of the ink which is discharged from the recording head, and the like problems.

SUMMARY OF THE INVENTION

Under such circumstances, a general object of the present invention is to provide a fluid supply valve which is well suited as an ink tank valve particularly in an ink jet recording apparatus for the purpose of favorably supplying a recording head portion from an ink chamber with an ink in an amount corresponding to the amount of an ink which is discharged from said recording head portion at the time of recording.

Other objects of the present invention will be obvious from the contents of this specification hereinafter disclosed.

As a result of intensive research and investigation accumulated by the present inventors in order to achieve the above-mentioned objects, it has been found that the reaction force at the time of the deformation of a disc-shaped valve body is weakened by the use of a disc-shaped valve body in which the thickness of the intermediate annular portion between the liquid supply port and the peripheral portion is non-uniformized in the radial direction as compared with a conventional valve body in which the thickness thereof is uniformized in the radial direction, and that the fluid supply valve using the former disc-shaped valve body can conform to the above-mentioned objects of the present invention.

In addition, it has been found that the reaction force at the time of the deformation of a disc-shaped valve body is weakened by the use of a disc-shaped valve body which is equipped with at least one inflectional portion in the radial direction between the liquid supply port and the peripheral portion as compared with a conventional valve body which is not equipped with any inflectional portion in the radial direction, and that the fluid feed valve using the former disc-shaped valve body can conform to the above-mentioned objects of the present invention. The present invention has been accomplished by the foregoing findings and information.

Specifically, the present invention provides a fluid supply valve comprising a disc-shaped valve body which is equipped with a fluid supply port in the central portion thereof and composes of an elastic material whose peripheral portion is reinforced and fixed with a rigid material, said fluid supply port being closed when said valve body abuts against a fixed valve seat placed so as to be opposite to said fluid supply port, and being opened when said valve body is separated from said fixed valve seat, wherein the thickness of the intermediate annular portion between the liquid supply port and the peripheral portion in said valve body is non-uniformized in the radial direction.

Moreover, the present invention provides a fluid supply valve comprising a disc-shaped valve body which is equipped with a fluid supply port in the central portion thereof and composed of an elastic material whose peripheral portion is reinforced and fixed with a rigid material, said fluid supply port being closed when said valve body abuts against a fixed valve seat placed so as to be opposite to said fluid supply port, and being opened when said valve body is separated from said fixed valve seat, wherein said valve body is equipped with at least one inflectional portion in the radial direction between the liquid supply port and the peripheral portion in said valve body.

DESCRIPTION OF PREFERRED EMBODIMENT

The fluid supply valve according to the present invention is imparted with such a structure that a fluid supply port is respectively closed or opened, when a disc-shaped valve body equipped with the fluid supply port in the central portion thereof respectively abuts against or is separate from a fixed valve seat placed so as to be opposite to the fluid supply port. The aforesaid disc-shaped valve body is composed of an elastic material whose peripheral portion is reinforced and fixed with a rigid material.

Figure 1:
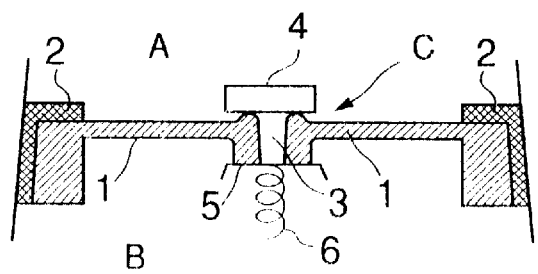
FIG. 1 is a cross-sectional view showing one example of an ink tank valve.
Figure 2:
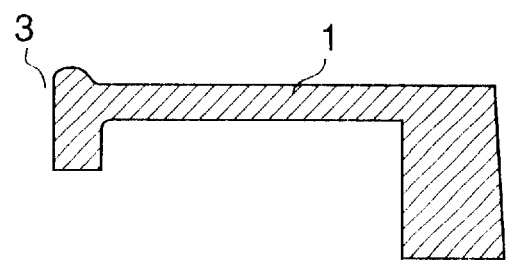
FIG. 2 is a partially cross-sectional view showing one example of a disc-shaped valve body to be used in said ink tank valve.

A typical example of the fluid supply valve is, for instance, the ink tank valve as shown in FIG. 1 in the foregoing ink jet recording apparatus.

In the following, detailed description will be given of the fluid supply valve according to the present invention with reference to the aforestated ink tank valve.

The ink tank valve according to the present invention is installed at the position dividing and ink chamber A and an ink supply portion B as shown in FIG. 1, and the functional mechanism thereof is as described hereinbefore. The thickness of the disc-shaped valve body in the ink tank valve is usually in the range of 0.1 to 0.5 mm, preferably 0.2 to 0.4 mm excluding thin-walled portions. The diameter of fluid (ink) supply port is usually in the range of 0.5 to 2 mm.

The size, that is , diameter of the disc-shaped valve body is not specifically limited, but is properly selected in accordance with various circumstances, usually in the range of 10 to 30 mm, approximately.

It is necessary in the disc-shaped valve body of the present invention to non-uniformize the thickness of the intermediate annular portion between the liquid supply port and the peripheral portion in the radial direction for the purpose of weakening the reaction force at the time of the deformation of the valve body.

The method for non-uniformizing said thickness is not specifically limited, and it is suitable to install at least one thin walled portion having a proper width along a circumferential direction in the intermediate annular portion between the liquid supply port and the peripheral portion. Embodiments that are particularly preferable from the viewpoint of the working effect are (1) installation of a thin-walled portion along a circumferential direction in the vicinity of the peripheral portion (refer to FIG. 7); (2) installation of a thin-walled portion along a circumferential direction in the vicinity of the fluid supply port; and (3) installation of thin-walled portions along a circumferential direction in the vicinities of the peripheral portion and the fluid supply port, respectively (refer to FIG. 8).

In the above-mentioned embodiments (1) to (3), the thickness of the thin-walled portion is usually 30 to 70% of the thickness of the thick-walled portion, while the width of the thin-walled portion is not specifically limited but is usually in the range of 0.5 to 20 mm.

By installing at least one thin-walled portion in the disc-shaped valve body in the above-mentioned manner, it is made possible to weaken the reaction force by concentrating the stress into the thin-walled portion at the time of the deformation of the valve body, more specifically as low as about 80% of the reaction force in the case of absence of a thin-walled portion. In the case where the disc-shaped valve body is made thin in whole, the smaller the wall thickness, the larger the contraction in the radial direction at the time of injection molding and as a result, the reaction force is not appreciably weakened. Such being the case, the width of the thin-walled portion is preferably within the extent that the contraction in the radial direction at the time of injection molding is negligible, particularly preferably within the above-mentioned range.

It is reasonable in the disc-shaped valve body of the present invention to install at least one inflectional portion in the radial direction between the liquid supply port and the peripheral portion instead of the aforstated thin-walled portion in order to weaken the reaction force at the time of the deformation of the valve body.

The method for installing the aforesaid inflectional portion is not specifically limited. Preferably, at least one inflectional portion particularly having a concave or convex cross-section is installed in the vicinity of the peripheral portion along a circumferential direction. Embodiments that are particularly preferable from the viewpoint of the working effect at (1) installation of an inflectional portion having a concave cross-section along a circumferential direction in the vicinity of the peripheral portion (refer to FIG. 9); (2) installation of continuous two inflectional portions having respective concave and convex cross-sections, along a circumferential direction in the vicinity of the peripheral portion (refer to FIGS. 10 to 12).

By installing at least one inflectional portion in the disc-shaped valve body in the above-mentioned manner, it is made possible to weaken the reaction force by concentrating the stress into the inflectional portion at the time of the deformation of the valve body, more specifically as low as about 30% of the reaction force in the case of absence of an inflectional portion. In addition, the disc-shaped valve body according to the present invention may be equipped with the inflectional portion as well as the above-mentioned thin-walled portion.

Depending upon the configuration and the like of the inflectional portion, deformation of the disc-shaped valve body will take place due to contraction thereof, as the case may be, at the time of injection molding, thus giving rise to displacement (displacement upon contraction) in the central part of the valve body. It being so, the inflectional portion preferably has the configuration capable of minimizing the displacement upon contraction.

Figure 3:
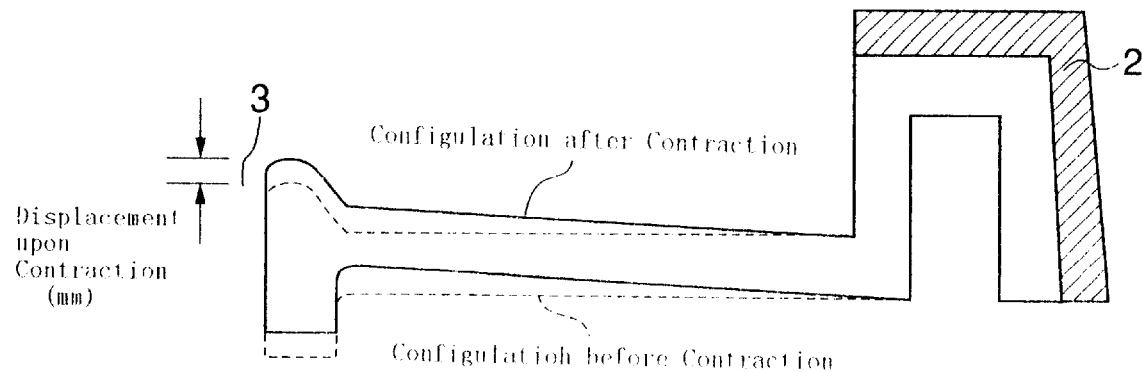
FIG. 3 is a partially cross-sectional view showing one example of a disc-shaped valve body which is equipped with an inflectional portion for the purpose of explaining the displacement at the time of contraction.

FIG. 3 is a partially cross-sectional view showing one example of a disc-shaped valve body which is equipped with an inflectional portion for the purpose of explaining the displacement at the time of contraction, wherein the portion encompassed by dotted lines is the configuration before contraction, while the portion encompassed by solid lines is the configuration after contraction. In the invention, the displacement upon contraction towards the ink supply portion is denoted as + (plus) displacement, and that towards the ink chamber is denoted as − (minus) displacement. The symbol 2 stands for a rigid material portion which reinforces and fixes the peripheral portion of the disc-shaped valve body, and the symbol 3 stands for a (fluid) supply port.

In addition, it is preferable that the disc-shaped valve body have favorable mold release properties after injection molding, and thus that the configuration of the inflectional portion be selected so as to improve the mold release properties thereof.

Figure 10:
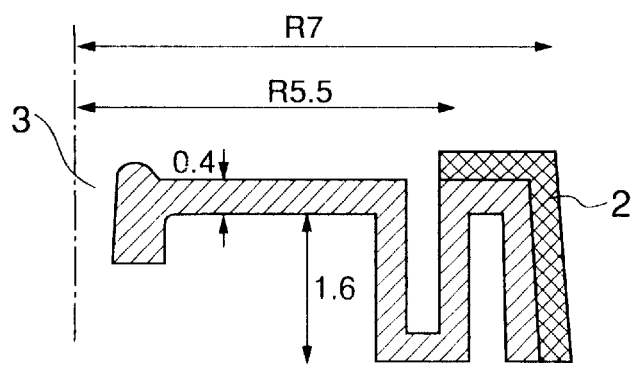
FIG. 10 is a partially cross-sectional view showing the disc-shaped valve body which has been made in Example 5.
Figure 11:
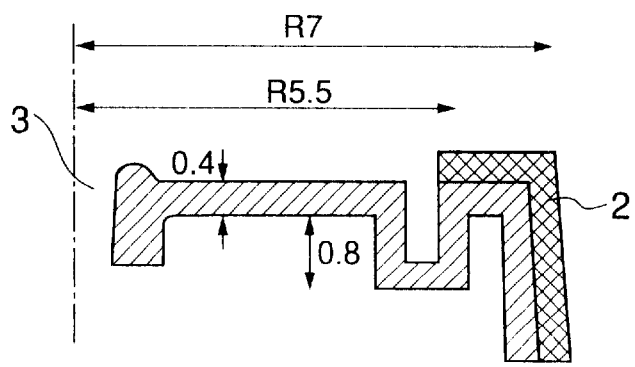
FIG. 11 is a partially cross-sectional view showing the disc-shaped valve body which has been made in Example 6.
Figure 12:
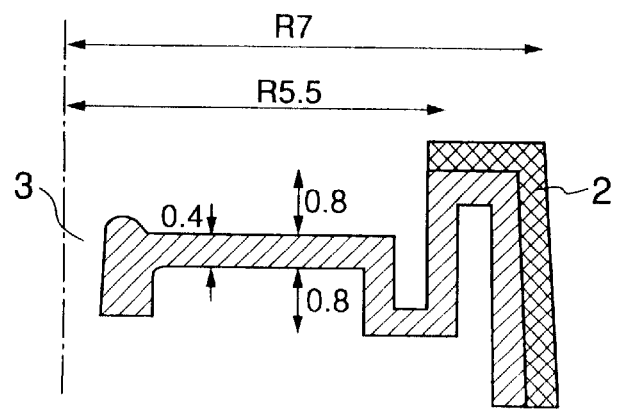
FIG. 12 is a partially cross-sectional view showing the disc-shaped valve body which has been made in Example 7.

Of the disc-shaped valve bodies each having specific configuration as represented in the foregoing FIGS. 9 to 12, respectively, the disc-shaped valve body having such configuration as represented in FIG. 12 is preferable taking into consideration the reaction force, displacement upon contraction, mold release properties, and the like.

The disc-shaped valve body in the fluid supply valve in the present invention is composed of the elastic material. There is used as the elastic material, a thermoplastic elastomer comprising a copolymer constituted of at least one polymer block containing a vinyl aromatic compound as a principal component and at least one polymer block containing a conjugated diene compound as a principal component.

Examples of said thermoplastic elastomer include: ① a block copolymer of crystalline polyethylene and ethylene/butylene-styrene random copolymer, said polyethylene being produced by hydrogenating a block copolymer of polybutadiene and butadiene-styrene random copolymer, and ② a diblock copolymer of crystalline polyethylene and polystrene; a triblock copolymer of styrene-ethylene/butylene-styrene (SEBS); a triblock copolymer of styrene-ethylene/propylene-styrene (SEPS); especially block copolymer of styrene ethylene/butylene-styrene; block copolymer of styrene-ethylene/propylene-styrene, each being produced by hydrogenating a block copolymer of polybutadiene and polystyrene and a block copolymer of polyisoprene and polystyrene or a block copolymer of polybutadiene or ethylene-butadiene random copolymer and polystrene.

Of these, is preferable in particular, in view of durability, a hydrogenated block copolymer which is produced by hydrogenating the block copolymer constituted of at least one polymer block containing a vinyl aromatic compound as a principal component and at least one polymer block containing a conjugated diene compound as a principal component, as is included in item ② and which has a number-average molecular weight of at least 30,000. The upper limit of the number-average molecular weight is not specifically limited, but is usually 400,000, approx.

Of the preferable hydrogenated block copolymer which is produced by hydrogenating the block copolymer constituted of at least one (one segment) polymer block containing a vinyl aromatic compound as a principal component and at least one polymer block containing a conjugated diene compound as a principal component as mentioned hereinbefore, is more preferable, a hydrogenated block copolymer which is produced by hydrogenating the block copolymer having at least two polymer blocks containing a vinyl aromatic compound as a principal component and at least one polymer block containing a conjugated diene compound as a principal component, which block copolymer is exemplified by styrene-butadiene styrene block copolymer and styrene-isoprene styrene block copolymer.

A softening agent may be blended as desired in the elastic material to be used in the present invention for the purpose of reducing the hardness of the above-mentioned thermoplastic elastomer. Said softening agent is not specifically limited, but may be arbitrarily selected for use from the softening agents which have heretofore been customarily employed for plastics and rubber.

It is preferable in the elastic material to be used in the present invention, that the high molecular organic material constituting the same has a three-dimensional continuous network skeleton structure. Moreover, the three-dimensional continuous network skeleton structure to be formed therein has an average diameter of the skeleton of at most 50 $\mu$m, preferably at most 30 $\mu$m, an average diameter of the cell (network) of at most 500 $\mu$m, preferably at most 300 $\mu$m, and a volumetric fraction of the high molecular organic material of at most 50%, preferably at most 33%, when the volumetric fraction of the high molecular organic material is defined as: [(volume of high molecular organic material)/(volume of high molecular organic material+volume of softening agent)]×100%.

The elastic material in the present invention may be blended with a well-known resin component and any of various additives for the purpose of improving a various properties. There are usable as a resin component, for example, poly(phenylene ether) resin, polyolefin resin, polystyrene resin and the like alone or in combination therewith. By adding the resin component and/or the additive, it is made possible to contrive to improve the compression set, processability and heat resistance of the elastic material to be used in the present invention.

Examples of the additives include flame retardants, antimicrobial agents, light stabilizers, ultraviolet rays stabilizers, antioxidants, inorganic fillers, organic fillers, colorants and silicone oils.

The disc-shaped valve body to be used in the present invention is reinforced and fixed with the rigid material in its peripheral portion. There is not specific limitation on the above-mentioned rigid material, and there is preferably used a plastics such as polypropylene.

As the method for producing the disc-shaped valve body, there can be adopted a two-color molding method which comprises the steps of melt-injection molding a plastic as the base material in a die; and then melt-injection molding the above-mentioned elastic material on the surface of the resultant plastic molding so as to integrally laminate said elastic material on the surface of the plastic molding. Alternatively, there can be adopted an insertion molding method which comprises the steps of melt-injection molding a plastic as the base material in a die; then inserting the molded article into another die; and subsequently melt-injection molding the above-mentioned elastic material on the surface of the resultant plastic molding so as to integrally laminate said elastic material on the surface of the plastic molding.

The fluid supply valve according to the present invention is well suited for use as an ink tank valve particularly in an ink jet recording apparatus, and is capable of favorably supplying a recording head portion from an ink chamber with an ink in an amount corresponding to the amount of the ink discharged from the recording head portion at the time of recording.

In the following, the present invention will be described in further detail with reference to comparative examples and working examples, which however shall never limit the present invention thereto.

Method for Measuring Reaction Force

Measurements were made in accordance with the procedure as described hereunder, of the reaction forces of the disc-shaped valve bodies that have been produced in the comparative examples and working examples.

Figure 4:
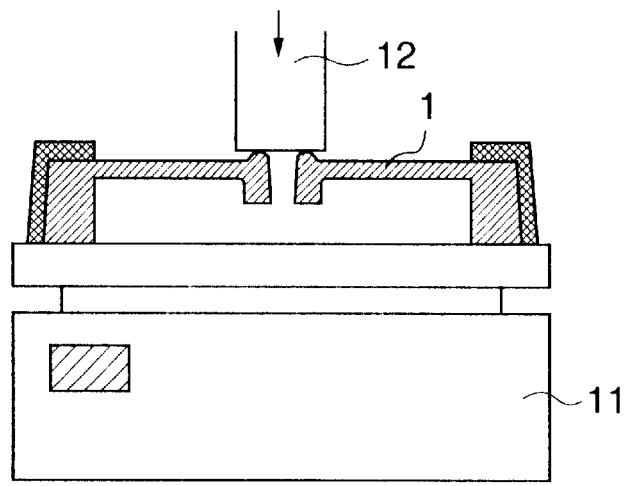
FIG. 4 is a schematic drawing showing an apparatus for the purpose of measuring the reaction force of the disc-shaped valve body.

In the first place, a disc-shaped valve body 1 as a sample was placed on a high accuracy precision load-meter 11 as shown in FIG. 4—a schematic drawing of an apparatus for the purpose of measuring the reaction force of a disc-shaped valve body. Next, a probe 12 attached to a high accuracy-precision displacement measuring apparatus was lowered to find the point at which the load-meter 11 just begins to point out a plus value, where the displacement of the sample was regarded as zero (0). Subsequently, a prescribed displacement was imparted to the disc-shaped valve body 1 by means of a probe 12, when the load was measured to determine the objective reaction force.

PREPARATION EXAMPLE 1

There was prepared an elastic material to be used for producing disc-shaped valve bodies in the following manner. Specifically, an elastic material was prepared by sufficiently kneading 100 parts by weight of styrene-ethylene/propylene-styrene triblock copolymer (SEPS){number-average molecular weight of 100,000, solubility parameter (SP value) of 8.5}, 150 parts by weight of paraffin base oil {produced by Idemitsu Kosan Co., Ltd. under the trade name "PW 380", weight average molecular weight of 750, solubility paramater (SP value) of 7.8} and 13 parts by weight of polypropylene resin. The elastic material thus prepared had a hardness of 20 as measured in accordance with JIS K 6301 (JIS: Japanese Industrial Standard).

COMPARATIVE EXAMPLE 1

Figure 5:
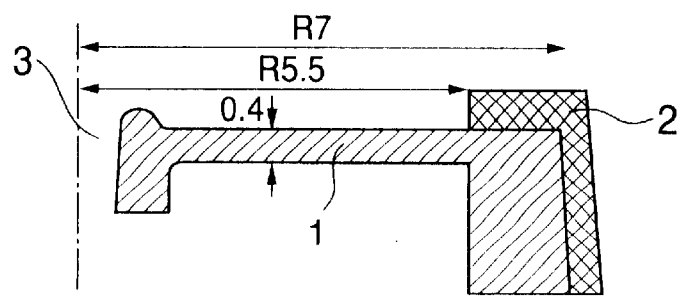
FIG. 5 is a partially cross-sectional view showing the disc-shaped valve body which has been made in Comparative Example 1.

By the use of the elastic material as obtained in the preceding Preparation Example 1 and polypropylene resin and by two-color molding method, there was prepared a disc-shaped valve body which had the cross-sectional shape as indicated in FIG. 5 (a half cross-sectional shape), a fluid supply port 3 installed at the center thereof and a uniform thickness of 0.4 mm, and the peripheral portion of which was reinforced with and fixed to a rigid material comprising polypropylene resin 2. Thus, there was obtained the relationship between the displacement and the reaction force of the resultant disc-shaped valve body. The results are given in Table 1.

EXAMPLE 1

Figure 6:
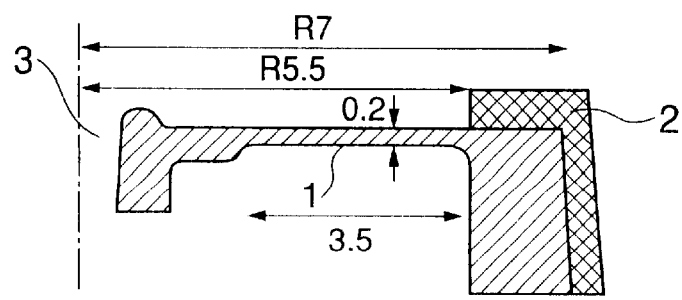
FIG. 6 is a partially cross-sectional view showing the disc-shaped valve body which has been made in Example 1.

By the use of the elastic material as obtained in the preceding Preparation Example 1 and polypropylene resin and by two-color molding method, there was prepared a disc-shaped valve body which had the cross-sectional shape as indicated in FIG. 6 (a half cross-sectional shape), a fluid supply port 3 installed at the center thereof and a wide thin-walled portion having a width of 3.5 mm and a thickness of 0.2 mm along the circumferential direction, and the peripheral portion of which was reinforced with and fixed to a rigid material comprising polypropylene resin 2. Thus, there was obtained the relationship between the displacement and the reaction force of the resultant disc-shaped valve body. The results are give in Table 1.

EXAMPLE 2

Figure 7:
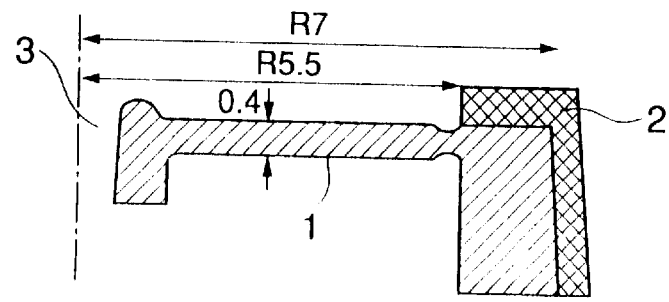
FIG. 7 is a partially cross-sectional view showing the disc-shaped valve body which has been made in Example 2.

By the use of the elastic material as obtained in the preceding Preparation Example 1 and polypropylene resin and by two-color molding method, there was prepared a disc-shaped valve body which had the cross-sectional shape as indicated in FIG. 7 (a half cross-sectional shape), a fluid supply port 3 installed at the center thereof and a thin-walled portion having a width of 0.5 mm and a thickness of 0.2 mmm in the vicinity of the peripheral portion along the circumferential direction, and the peripheral portion of which was reinforced with and fixed to a rigid material comprising polypropylene resin 2. Thus, there was obtained the relationship between the displacement and the reaction force of the resultant disc-shaped valve body. The results are given in Table 1.

EXAMPLE 3

Figure 8:
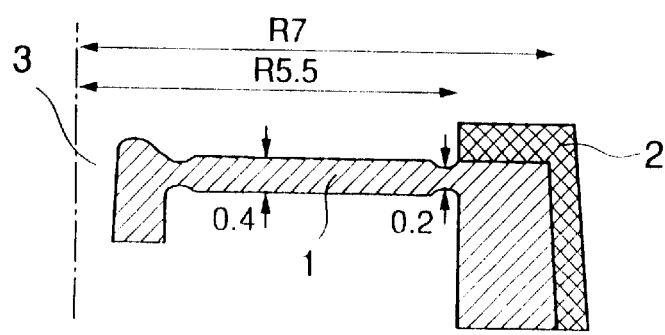
FIG. 8 is a partially cross-sectional view showing the disc-shaped valve body which has been made in Example 3.

By the use of the elastic material as obtained in the preceding Preparation Example 1 and polypropylene resin and by two-color molding method, there was prepared a disc-shaped valve body which had the cross-sectional shape as indicated in FIG. 8 (a half cross-sectional shape), a fluid supply port 3 installed at the center thereof and thin-walled portions each having a width of 0.5 mm and a thickness of 0.2 mm in the vicinities of the peripheral portion and the fluid supply port portion, respectively along the circumferential direction, and the peripheral portion of which was reinforced with and fixed to a rigid material comprising polypropylene resin 2. Thus, there was obtained the relationship between the displacement and the reaction force of the resultant disc-shaped valve body. The results are given in Table 1.

TABLE 1

| | Reaction force (g) | | | |
|---|---|---|---|---|
| | Comparative | Example | | |
| | Example 1 | 1 | 2 | 3 |
| Displacement (mm) | | | | |
| 0 | 0.0 | 0.0 | 0.0 | 0.0 |
| 0.1 | 0.6 | 0.7 | 0.6 | 0.5 |
| 0.2 | 1.4 | 1.4 | 1.3 | 1.1 |
| 0.3 | 2.2 | 2.2 | 2.0 | 1.7 |
| 0.4 | 3.1 | 3.0 | 2.8 | 2.4 |
| 0.5 | 4.1 | 3.9 | 3.7 | 3.2 |
| 0.6 | 5.3 | 4.8 | 4.7 | 4.1 |
| 0.7 | 6.6 | 5.9 | 5.9 | 5.2 |
| 0.8 | 8.1 | 7.0 | 7.2 | 6.3 |
| 0.9 | 9.7 | 8.3 | 8.6 | 7.7 |
| 1.0 | 11.5 | 9.6 | 10.2 | 9.1 |

As can be seen from Table 1, the values of reaction force in Examples 1 to 3 are on the whole, lower than the values of reaction force in Comparative Example 1, and since the actual displacement is about 0.2 mm, in the case of the displacement being 0.2 mm the values of reaction force is lowered in Example 2, and markedly in Example 3 though not lowered in Example 1.

EXAMPLES 4 TO 7

Figure 9:
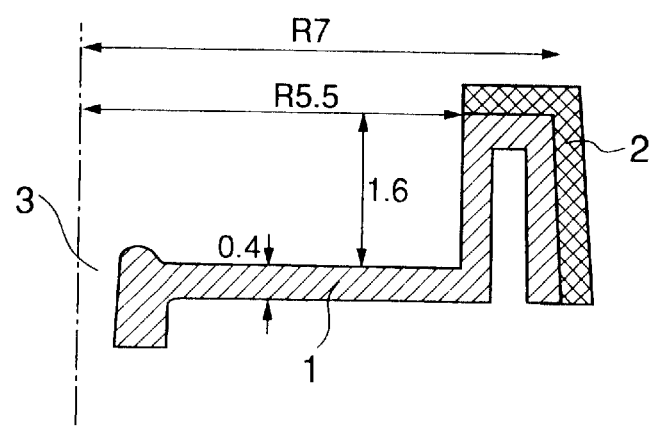
FIG. 9 is a partially cross-sectional view showing the disc-shaped valve body which has been made in Example 4.

By the use of the elastic material as obtained in the preceding Preparation Example 1 and polypropylene resin and by two-color molding method, there were prepared disc-shaped valve bodies which had each the cross-sectional shape as indicated in FIG. 9 (a half cross-sectional shape in Example 4), FIG. 10 (a half cross sectional shape in Example 5), FIG. 11 (a half cross-sectional shape in Example 6) and FIG. 12 (a half cross-sectional shape in Example 7), a fluid supply port 3 installed at the center thereof and at least one inflectional portion in the vicinity of the peripheral portion, along the circumferential direction, and the peripheral portion of which was reinforced with and fixed to a rigid material comprising polypropylene resin 2. Thus, there was obtained the relationship between the displacement and the reaction force for each of the disc-shaped valve bodies thus obtained in the case where the displacement was 0.2 mm and at the same time, a measurement was made of the displacement upon contraction at the time of molding for each of the valve bodies. The results are given in Table 2.

TABLE 2

|  | Reaction force (g) when displacement was 0.2 mm | Displacement upon contraction (mm) |
| --- | --- | --- |
| Comparative Example 1 | 1.4 | — |
| Example 4 | 0.4 | −0.174 |
| Example 5 | 0.5 | −0.011 |
| Example 6 | 0.6 | 0.127 |
| Example 7 | 0.5 | −0.024 |

As can be seen from Table 2, the values of reaction force in Examples 4 to 7 are in whole, about 30% lower than the value of reaction force in Comparative Example 1; the displacements upon contraction are rather large in Examples 4 and 6; when the results in Example 5 are compared with those in Example 7 each having a small displacement upon contraction, the mold release properties in Example 7 are superior to those in Example 5, and accordingly the results lead to the conclusion that Example 7 is the best among the Examples 4 to 7.

What is claimed is:

1. A fluid supply valve comprising a disc-shaped valve body which is equipped with a fluid supply port in the central portion thereof and composed of an elastic material whose peripheral portion is reinforced and fixed with a rigid material, said fluid supply port being closed when said valve body abuts against a fixed valve seat placed so as to be opposite to said fluid supply port, and being opened when said valve body is separated from said fixed valve seat, wherein the thickness of the intermediate annular portion between said fluid supply port and the peripheral portion in said valve body is non-uniformized in the radial direction, wherein the disc-shaped valve body is equipped with at least one thin-walled portion in the vicinity of the peripheral portion thereof along the circumferential direction, and wherein the thickness of the thin walled portion is in the range of 30 to 70% of a thick walled portion.

2. The fluid supply valve according to claim 1, wherein the rigid material is polypropylene.

3. The fluid supply valve according to claim 1, wherein the elastic material comprises a thermoplastic elastomer comprising a copolymer constituted of at least one polymer block containing a vinyl aromatic compound as a principal component and at least one polymer block containing a conjugated diene compound as a principal component.

4. A fluid supply valve comprising a disc-shaped valve body which is equipped with a fluid supply port in the central portion thereof and composed of an elastic material whose peripheral portion is reinforced and fixed with a rigid material, said fluid supply port being closed when said valve body abuts against a fixed valve seat placed so as to be opposite to said fluid supply port, and being opened when said valve body is separated from said fixed valve seat, wherein the thickness of the intermediate annular portion between said fluid supply port and the peripheral portion in said valve body is non-uniformized in the radial direction, wherein the disc-shaped valve body is equipped with at least one thin-walled portion in the vicinity of the fluid supply portion thereof along the circumferential direction, and wherein the thickness of the thin-walled portion is in the range of 30 to 70% of a thick-walled portion.

5. The fluid supply valve according to claim 4, wherein the rigid material is polypropylene.

6. The fluid supply valve according to claim 4, wherein the elastic material comprises a thermoplastic elastomer comprising a copolymer constituted of at least one polymer block containing a vinyl aromatic compound as a principal component and at least one polymer block containing a conjugated diene compound as a principal component.

7. A fluid supply valve comprising a disc-shaped valve body which is equipped with a fluid supply port in the central portion thereof and composed of an elastic material whose peripheral portion is reinforced and fixed with a rigid material, said fluid supply port being closed when said valve body abuts against a fixed valve seat placed so as to be opposite to said fluid supply port, and being opened when said valve body is separated from said fixed valve seat, wherein the thickness of the intermediate annular portion between said fluid supply port and the peripheral portion in said valve body is non-uniformized in the radial direction, wherein the disc-shaped valve body is equipped with at least two thin-walled portions in the vicinities of the peripheral portion thereof and the fluid supply portion, respectively along the circumferential direction, and wherein the thickness of the thin-walled portion is in the range of 30 to 70% of a thick-walled portion.

8. The fluid supply valve according to claim 7, wherein the rigid material is polypropylene.

9. The fluid supply valve according to claim 7, wherein the elastic material comprises a thermoplastic elastomer comprising a copolymer constituted of at least one polymer block containing a vinyl aromatic compound as a principal component and at least one polymer block containing a conjugated diene compound as a principal component.

* * * * *

UNITED STATES PATENT AND TRADEMARK OFFICE
CERTIFICATE OF CORRECTION

PATENT NO. : 6,394,137 B1
DATED : May 28, 2002
INVENTOR(S) : Miyazawa et al.

It is certified that error appears in the above-identified patent and that said Letters Patent is hereby corrected as shown below:

<u>Title page,</u>
Items [12] and [75], the Inventor information is incorrect. Items [12] and [75] should read:

-- [12] United States Patent
    Miyazawa et al.

[75] Inventors: Hisashi Miyazawa, Nagano;
Hirofumi Kikuchi, Kanagawa;
Youichi Nishimuro, Kunio Machida, both of Tokyo, all of (JP) --

Signed and Sealed this

Twenty-second Day of October, 2002

Attest:

Attesting Officer

JAMES E. ROGAN
*Director of the United States Patent and Trademark Office*